(12) United States Patent
McMahon

(10) Patent No.: US 6,247,500 B1
(45) Date of Patent: Jun. 19, 2001

(54) CONDUIT SYSTEMS

(75) Inventor: Michael John McMahon, Nunderi (AU)

(73) Assignee: Zardoz Pty Ltd, Nunderi (AU)

( * ) Notice: Subject to any disclaimer, the term of this patent is extended or adjusted under 35 U.S.C. 154(b) by 0 days.

(21) Appl. No.: 09/402,849

(22) PCT Filed: Apr. 8, 1998

(86) PCT No.: PCT/AU98/00238

§ 371 Date: Oct. 7, 1999

§ 102(e) Date: Oct. 7, 1999

(87) PCT Pub. No.: WO98/45915

PCT Pub. Date: Oct. 15, 1998

Related U.S. Application Data

(60) Provisional application No. 60/041,859, filed on Apr. 8, 1997.

(51) Int. Cl.⁷ ........................................................ F16L 9/00
(52) U.S. Cl. .................. 138/157; 138/162; 138/166; 285/373
(58) Field of Search ................... 138/157, 162, 138/166, 167, 156, 128, 151; 285/373

(56) References Cited

U.S. PATENT DOCUMENTS

| | | | |
|---|---|---|---|
| 3,126,035 | * 3/1964 | Espetvedt | 138/166 X |
| 3,204,668 | 9/1965 | Emerson, Jr. et al. | 138/158 |
| 3,425,456 | * 2/1969 | Schibig | 138/162 |
| 3,628,572 | * 12/1971 | Shannon | 138/166 X |
| 3,944,260 | 3/1976 | Petroczky | 138/99 X |
| 4,109,944 | 8/1978 | Curtin | 285/373 |
| 4,260,181 | * 4/1981 | Curtin | 285/15 |
| 4,298,554 | * 11/1981 | Vogel et al. | 138/166 X |
| 4,304,267 | 12/1981 | Campbell, Jr. | 138/149 |
| 4,374,596 | 2/1983 | Schlemmer et al. | 138/155 X |
| 4,576,846 | 3/1986 | Noel | 138/128 X |
| 4,652,023 | 3/1987 | Timmons | 138/99 X |
| 4,857,670 | * 8/1989 | Frank et al. | 138/166 X |
| 4,944,976 | * 7/1990 | Plummer, III | 138/166 X |
| 4,967,800 | * 11/1990 | Heilmayr et al. | 138/166 X |
| 5,007,666 | * 4/1991 | Kyfes | 138/166 X |
| 5,022,685 | * 6/1991 | Stiskin et al. | 138/166 X |
| 5,134,250 | * 7/1992 | Caveney et al. | 138/166 X |
| 5,443,096 | 8/1995 | King | 138/99 |
| 5,469,893 | * 11/1995 | Caveney et al. | 138/166 X |
| 5,607,666 | 3/1997 | Masson et al. | 424/69 |
| 5,875,821 | * 3/1999 | Dumser et al. | 138/162 |

FOREIGN PATENT DOCUMENTS

| | | |
|---|---|---|
| 236968 | 4/1960 | (AU) . |
| 73044 | 7/1981 | (AU) . |
| 18343 | 8/1983 | (AU) . |
| 70072 | 8/1991 | (AU) . |
| 83848 | 3/1992 | (AU) . |
| 117052 | 5/1993 | (AU) . |
| 68918 | 10/1994 | (AU) . |
| 28 41 236 | 4/1980 | (DE) . |
| 499 885 | 8/1992 | (EP) . |

OTHER PUBLICATIONS

Derwent Abstracts (Accession No. 63769 E/31), DD–154 236, dated Mar. 3, 1982, English Abstract with one drawing (2 pages).

* cited by examiner

*Primary Examiner*—Patrick Brinson
(74) *Attorney, Agent, or Firm*—Flynn, Thiel, Boutell & Tanis, P.C.

(57) ABSTRACT

A modular conduit system comprises elongate conduit elements (50, 51) and conduit fitting elements (30, 37) longitudinally divided and provided with tongue and groove joints configured such that identical conduit halves or identical conduit fitting halves can be snap fitted together and released interengaged by radially directed resilient restoration forces in the fitting elements. The interengageable tongue (1*a*) formation and corresponding groove formation (2*b*) each have at least one radial curvature with the same radial origin when opposing elements are interengaged.

13 Claims, 5 Drawing Sheets

CONDUIT SYSTEMS

This application claims benefit of Provisional Ser. No. 60/041,859 filed Apr. 8, 1997 and this application is also a 371 of PCT/AU98/00238 filed Apr. 9, 1998.

This invention is concerned with an improved modular plastics conduit system for electrical cabling fluid conduits and the like.

The invention also relates to a repair system for existing damaged conduits.

Hitherto there have been many attempts over the last forty years or so to provide modular conduits and fittings therefor, particularly for in-situ repairs to damaged conduit systems.

The absence from the marketplace of such systems and the increasing number of patents sought for such systems is a clear illustration of their infeasibility, either in terms of functional adequacy or in terms of manufacturing costs.

Australian Patent Application No. 18343/83 and Australian Patent Application No. 70072/91 respectively describe multi-part, longitudinally divided plastics conduits which are readily assembled on site and avoid the need to thread cables or wires through a conventional one-piece tubular conduit. Each describes a snap in tongue and groove connection between a longitudinally extending rib having an enlarged bead on its free edge and a longitudinally extending groove having a cross sectional shape complementary to the cross sectional shape of the rib, the free edges of the groove being resiliently deformable to receive the enlarged bead.

While generally effective for their intended purpose, they are not adapted for mechanical or fluid tight engagement with a suite of couplings such as tees, elbows, inspection ports or the like.

Moreover, neither of the above conduit systems lends itself to in situ repair of existing damaged conduits nor are either suited to in situ repairs, branching or the like short of complete removal and replacement of an entire length of damaged conduit member.

U.S. Pat. No. 4,967,800 describes a secondary confinement pipe assembled from identical segments of extruded plastics material.

The opposite edges of semi-circular pipe sections include longitudinally extending beaded ribs and complementary narrow mouthed grooves, at least one of which includes a co-extruded resilient plastics material to enhance fluid sealing in the opposed tongue and groove joints.

This confinement pipe is designed for fitment only about a straight length of primary pipe for the purpose of monitoring leakage between the primary and secondary pipes. No mention is made of confinement of fittings such as tees, elbows etc.

Australian Patent No. 236968, Australian Patent Application No. 73044/81 and U.S. Pat. Nos. 3,204,668, 3,126,035, 4,304,267 and 4,576,846 each disclose thermal sheathing systems for is straight lengths of pipe which permit in-situ fitting to an existing pipe.

With the exception of U.S. Pat. No. 4,304,267, which relates to interlocking refractory elements, each of these thermal sheathing patent documents discloses longitudinally extending tongue and groove joints to secure the sheathing in situ around a straight length of pipe.

Again these patent documents are silent as to complementary fittings for tees, elbows and inspection ports in the pipe to be insulated.

Australian Registered Design No. 117052 describes a one piece moulded tee coupling split longitudinally but connected by an integrally formed hinge so that it may be closed and secured by bolts or screws through fillets at the junction between the upright and transverse portions. The edges of one half portion are formed with upstanding ribs which locate in corresponding channels in the edges of the other portion when the two halves are abutted.

U.S. Pat. Nos. 3,944,260, 4,109,944, 4,260,181, 4,374,596, 4,652,023 and 5,443,096 each describe pipe couplings or pipe repair couplings formed in two longitudinally split half sections and designed for fitment about a leaking pipe coupling, a damaged straight pipe or otherwise facilitate electrical trunking systems.

U.S. Pat. Nos. 3,944,260 and 4,652,023 describe flange bolted repair couplers for damaged fittings and straight pipe sections respectively.

U.S. Pat. Nos. 4,109,944 and 4,260,181 describe repair couplers for adhesive bonding to plastics piping. Overlapping tabs and grooves with interengaging teeth mechanically lock the two halves of the fittings while the adhesive sets.

Electrical duct fittings comprising longitudinally split halves are disclosed in U.S. Pat. No. 4,374,596. One half includes a non beaded discontinuous rib on each free edge while the other half includes parallel sided discontinuous channels on each free edge while the other half includes parallel sided discontinuous channels on each free edge to mate with the ribs of the other half. Resilient lips protruding from the outer surface of the fittings engage in slots in conduits which engage over the ends of the fittings.

U.S. Pat. No. 5,443,096 describes a repair coupling for straight pipes, the coupling comprising similar halves which snap together by resilient deformation of interengaging hooked lips to mechanically retain the fitting under compression while an adhesive bond is formed between the coupling and the pipe.

A tongue and groove snap-fit pipe coupling for joining and or repairing thermoplastic pipes by mechanical and adhesive bonding is described in U.S. Pat. No. 5,007,666. This patent discloses straight couplings for repair or jointing of plastics conduits as well as elbows, tees and cruciform couplings having a tongue and groove edge joint wherein the tongue is slotted to permit contraction to enter the groove and expansion to lock within the groove.

In my Australian Patent No. 648818 and copending Australian Patent Application No. 68918/94 there is described a modular conduit system wherein elongate conduit elements and conduit fitting elements are provided on opposed free edges with a beaded rib and a recessed channel in to which the beaded rib locates.

Although generally satisfactory for their intended purpose these element suffer a number of practical disadvantages.

While the elongate conduit elements may be extruded satisfactorily, difficulties have been encountered in economical production of the conduit fitting elements by injection moulding.

From the outset, separate dies or die cavities must be formed to fabricate the interengaging halves of the fittings as they are not true mirror images of each other.

Moreover the formation of the beaded rim portion of the conduit elements requires compound dies to enable release of the rib portions after moulding. This has not been practically achievable with the undercut groove portions even with a compound die assembly due to "hang-ups" and distortion upon release from the die. These problems are exacerbated by the relatively small proportions and close proximity of the beaded rim and undercut channel on opposed free edges of the fittings.

While all of the prior art conduits, pipe couplings and repair couplings are satisfactory for their respective intended purposes, all suffer from one or more disadvantages including high tooling costs, incompatibility between conduit structures and coupling structures and a lack of modularity. In other words none of the prior art permits a complete conduit system comprising a split conduit and a suite of complementary split fittings which enables an initial conduit installation, repairs to a damaged installation or ready modification to an existing conduit installation.

It is an aim of the present invention to overcome or alleviate at least some of the disadvantages of prior art conduit systems and to provide a modular conduit system applicable to a wide range of circumstances.

According to one aspect of the invention there is provided a modular conduit system comprising:

longitudinally divided elements engagable to form a hollow conduit having a smooth bore of substantially circular cross section, said elements characterised in the provision of one or more interengageable complementary tongue and groove formations along opposed free edges thereof, said tongue formation and said groove formation each having at least one radial curvature with the same radial origin when opposing elements are interengaged, said opposing elements being engagable or disengagable against radial deformation forces applied to said opposing elements.

Suitably said one or more tongue formations of one element having a tapered leading edge receivable in one or more groove formations of an adjacent interengaged element, said one or more groove formations each having a floor with a complementary taper.

Preferably a portion of the outer wall of each said element forming an outer side wall of a respective groove formation has a tapered leading edge adapted to engage beneath a complementary tapered recess adjacent a tongue formation of an adjacent interengaged element.

If required, a portion of the inner wall of each said element forming an inner side wall of a respective groove formation has a shouldered abutment adapted to engage in a complementary shouldered recess adjacent a tongue formation of an adjacent interengable member.

The longitudinally divided elements comprising the modular conduit system may be selected from elongate parallel sided elements, angular bend elements, tee-junction elements, cruciform junction elements and the like.

Preferably each element is configured such that a conduit or conduit coupling may be assembled by respective interengagement of identical conduit elements or conduit fitting elements.

If required the modular conduit system may also include hollow inspection port elements having a removable cover plate, said inspection port elements having tongue and groove formations adapted for interengagement with respective groove and tongue formation on said conduit elements or said conduit fitting elements, the limbs of said inspection port elements being shorter than the corresponding conduit element or said conduit fitting elements to permit engagement by a conduit element of an exposed portion of said conduit elements or said conduit fitting elements.

If required the conduit fitting elements may include raised abutments on the free edges thereof at the junction between adjacent limbs, said raised abutments being engagable in corresponding recesses in the free edges of corresponding inspection port elements.

The elongate conduit elements and/or the conduit fitting elements may be proportioned to correspond with conventional conduit diameters or they may be formed with an internal diameter to correspond with the external diameter of a conventional elongate one piece conduits and/or conduit fittings such that they may be engaged over an existing portion of conduit system for repair purposes or to introduce branched junctions.

The elongate conduit elements and conduit fitting elements may be interengaged by frictional engagement and retained against disengagement by resistance to radial deformation forces whereby the conduit system may be disengaged selectively.

Alternatively, the elongate conduit elements and/or conduit fitting elements may be permanently interengaged by employment of a suitable adhesive compound in the region of the tongue and groove joints.

According to another aspect of the invention there is provided a method of installation of a modular conduit system according to the first aspect of the invention wherein longitudinally divided conduit and conduit fitting elements are engaged to form a substantially continuous channel-like pathway, electrical wiring or the like is progressively introduced into the recess of the channel-like pathway and the conduit system is progressively closed by interengagement of conduit elements with the channel-like pathway already formed to form a closed tubular conduit system.

According to yet another aspect of the invention there is provided a method of forming a branched junction in a conduit system according to a first aspect of the invention wherein selected outermost elements of the modular conduit system are disengaged from inner elements, portion of the exposed channel-like pathway are removed and replaced with a first longitudinally divided branched conduit element, second interengaging branched conduit element is attached to the first element to form an enclosed branched junction and suitably shortened elongate conduit elements are re-engaged with the existing channel-like pathway to form a closed tubular branched pathway.

In order that the invention may be more readily understood and put into practical effect, reference will now be made to preferred embodiments described with reference to the accompanying drawings in which.

Figure 1:
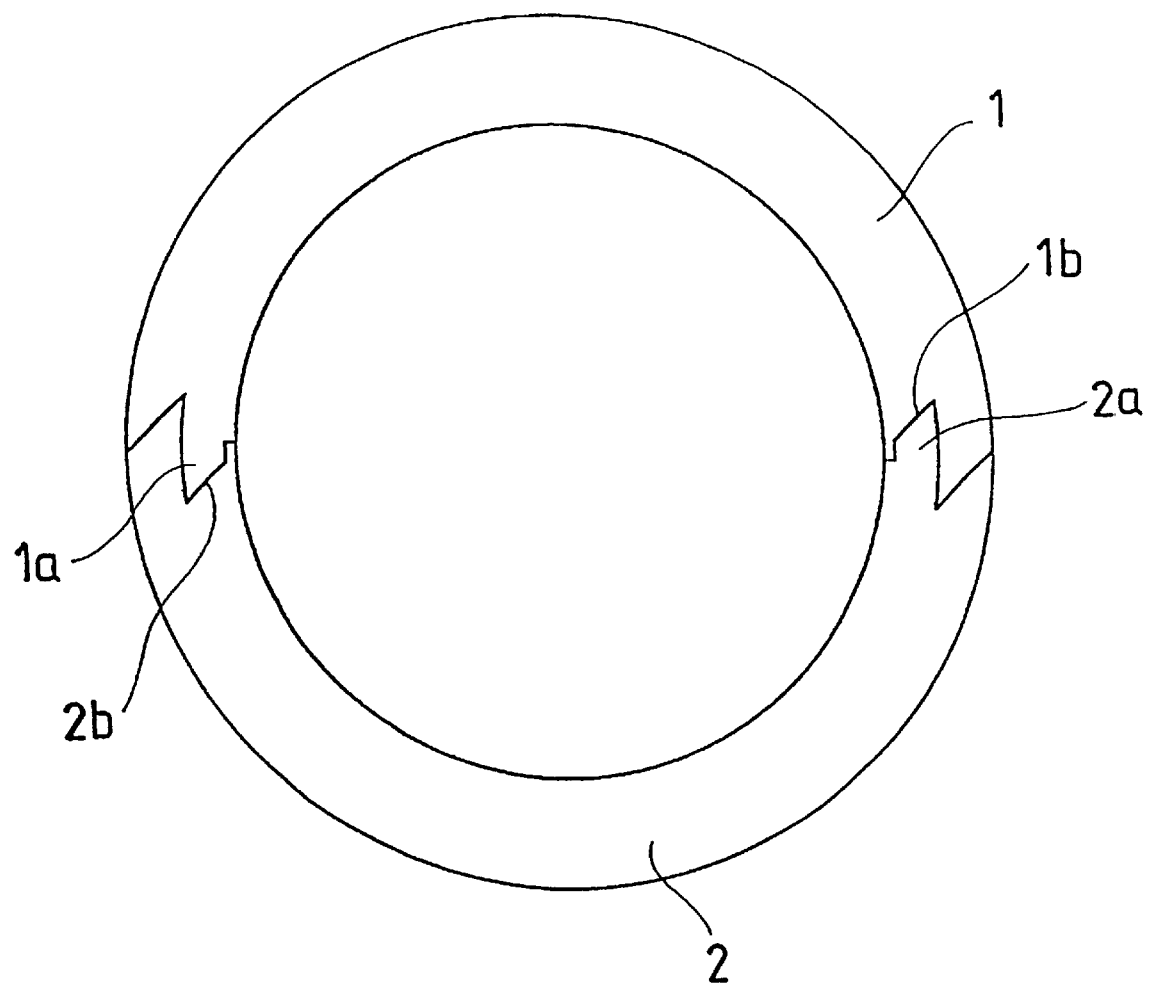
FIG. 1 shows a cross sectional view of interengaged conduit elements.

In FIG. 1 which may illustrate a cross-sectional view of an elongate conduit assembly or a limb of a conduit fitting assembly, it can be seen that the two halves 1 and 2 are identical to permit frictional engagement of tongues 1a and 2a into respective complementary grooves 1b, 2b.

It can be seen that in the case of extruded elongate conduit elements, only a single extrusion die is needed to produce complementary longitudinally divided halves of a tubular conduit.

Figure 2:
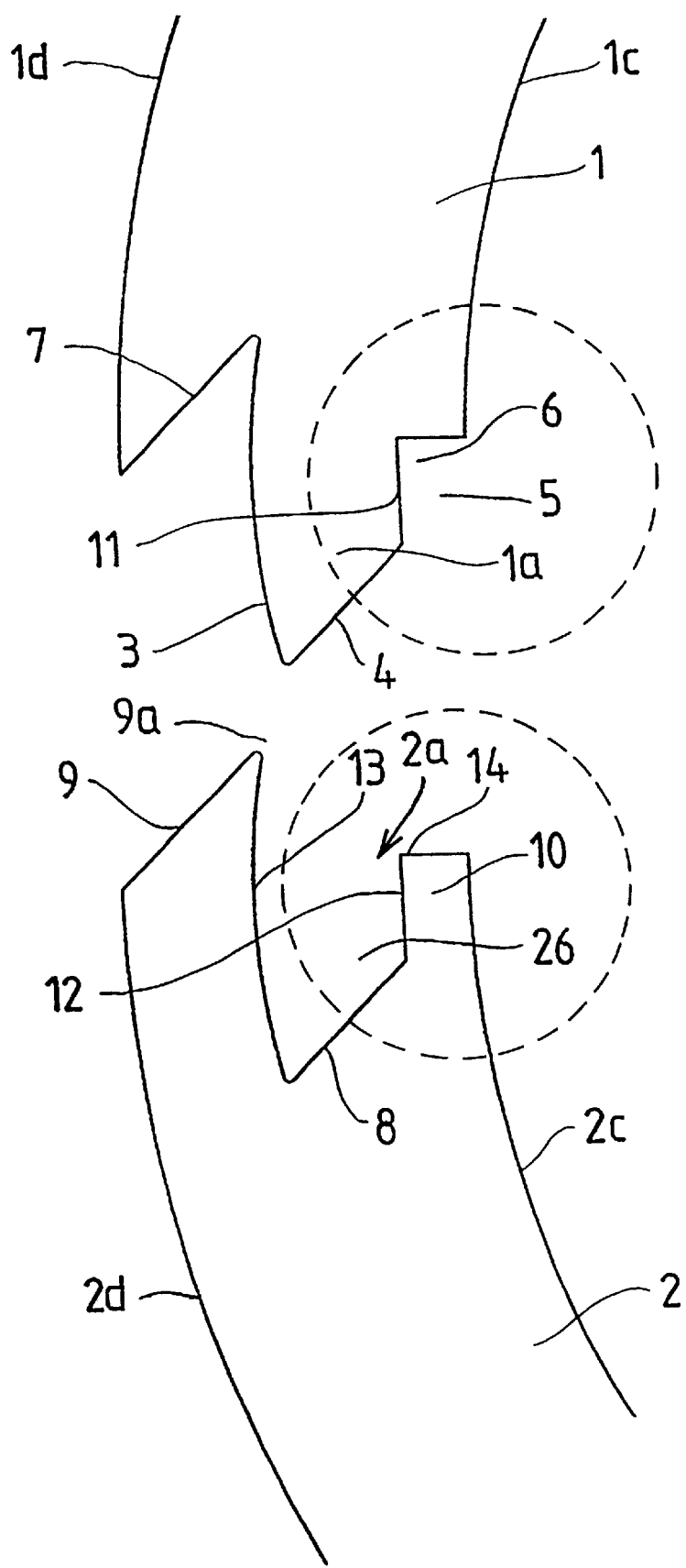
FIG. 2 shows an enlarged view of the tongue and groove engagement of conduit elements according to the invention.

The enlarged view of the complementary tongue and groove jointing system and its mode of operation is clearly shown in FIG. 2 wherein like reference numerals have been employed for ease of understanding.

In FIG. 2 it can be seen that the tongue portion 1a of element 1 comprises an arcuate outer surface 3 with a radius of curvature having its origin coincident with the radii of curvature of the inner and outer walls 1c, 1d and 2c, 2d of elements 1 and 2 respectively.

Tongue portion 1a has a tapered leading edge 4 and a shouldered recess 5 on its inner side 6.

Between outer surface 3 of tongue 1a and the outer surface 1d of element 1 is a tapered recess 7.

The free edge of element 2 is formed with contours complementary to the free edge of element 1 in that the floor 8 of groove 2a and the leading edge 9 of the outer wall portion of groove 2b have complementary tapered edges. A shouldered abutment 10 on the inner wall portion of groove 2b nests into shouldered recess 6 of element 1 when the complementary free edges engage. Similarly, the curved inner wall 13 of groove 8 has the same radius of curvature as wall 3 of tongue 1a.

It can be seen that abutting surfaces 11 and 12 of tongue 1a and groove 2b are planar and generally tangential to the various radii of curvature having a common origin.

As the tongue and groove portions 1a, 2b respectively are brought together, tapered edge 4 of tongue 1a partially enters groove 2b and the leading edge 9a of tapered leading edge 9 engages against the outer surface of the curved wall portion 3 of tongue 1a. Tongue 1a is thus unable to freely enter groove 2b as the respective radial origins of wall 3 and wall 13 are not coincident in the detached position shown and thus the respective cooperable tongue and groove portions on either side of the conduit elements are misaligned.

By applying pressure to the opposing conduit elements the semi-circular wall portions of elements 1 and 2 as well as the tongue 1a and groove walls 12, 13 are radially deformed in a resilient manner by wedging a tapered tongue face 4 between groove walls 12, 13.

As the tapered face 4 of tongue 1a rides up over the edge 14 of shouldered abutment 10, tongue 1a is then able to enter groove 2b against the radially directed resilient restoring forces of the conduit elements.

Once tongue 1a is fully seated within groove 2b, radially directed resilient restoration forces are released but it will be noted that the two halves of the conduit elements 1, 2 are firmly locked together as to disengage the two halves, the same radially directed resilient restoration forces must be overcome.

A particular advantage arising from the tongue and groove interengagement of conduit element according to the invention is that elongate conduit halves are readily extruded and, in the absence of undercut recesses or bulbous ribs, the conduit fitting halves are readily injection moulded without the need for complex and expensive compound injection moulding dies with movable components.

Figure 3:
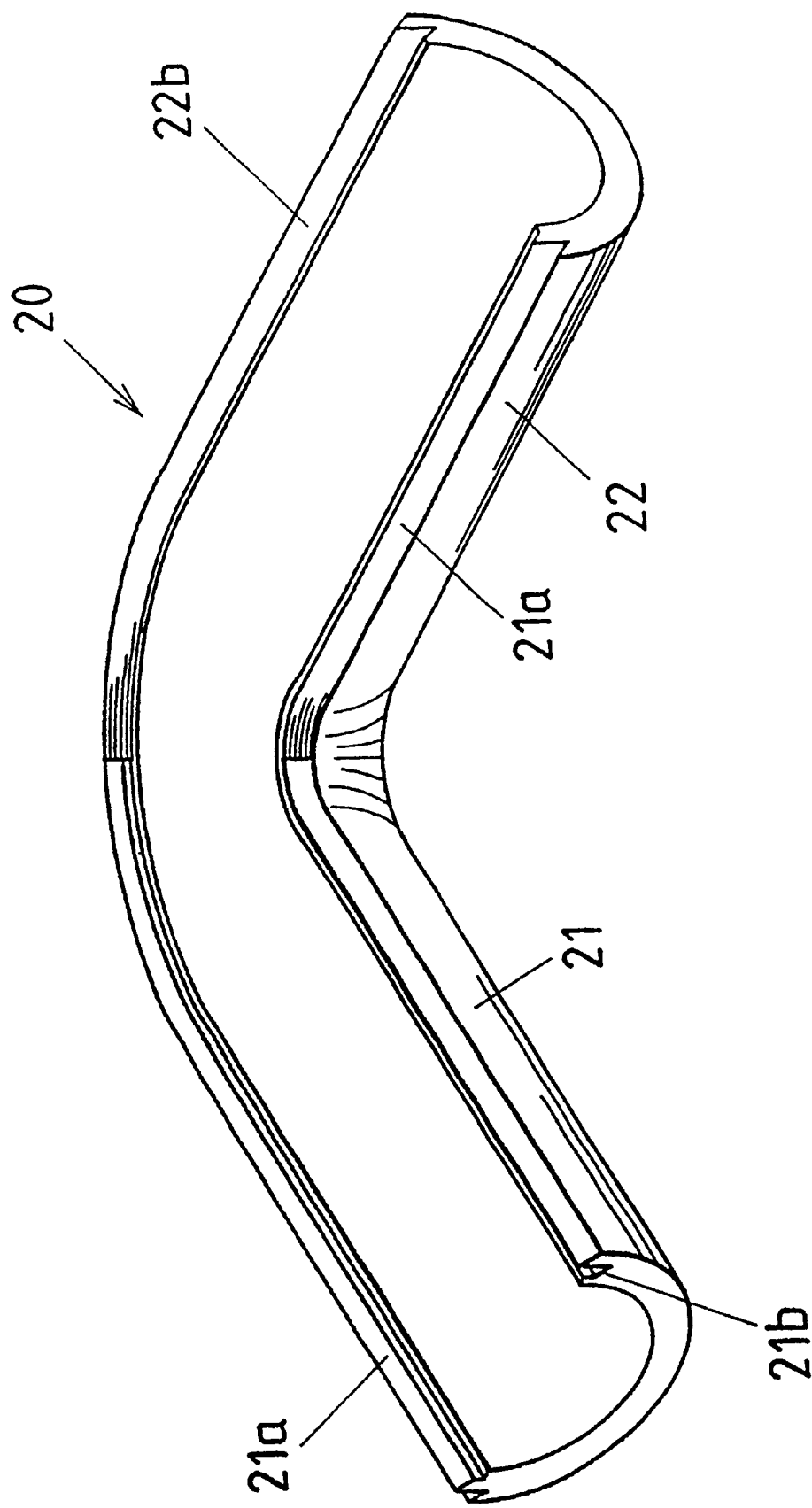
FIG. 3 shows an elbow conduit fitting element according to the invention.

FIG. 3 shows an elbow fitting 20 according to the invention.

The elbow fitting comprises two limbs 21, 22 at 90° to each other to form a right angle channel-like recess of semi-circular cross section.

While it is necessary to have a tongue portion 21a on one free edge of limb 21 and a groove portion 21b on the opposite free edge, the fitting elements according to the invention are distinguished in that the tongue and groove portions 21a, 21b do not extend entirely about the outer and inner free edges respectively as in prior art fittings of this type.

At the junctions of the inner and outer free edges of limbs 21, 22, tongue portion 21a becomes a groove portion 22b and groove portion 21b becomes a tongue portion 22a.

In this manner two identical elbow fittings 20 as depicted may be interengaged to form a hollow tubular elbow fitting (not shown) thereby necessitating a single die or die cavity for injection moulding whereas the prior art requires separate die mouldings to form the assembled fitting.

Figure 4:
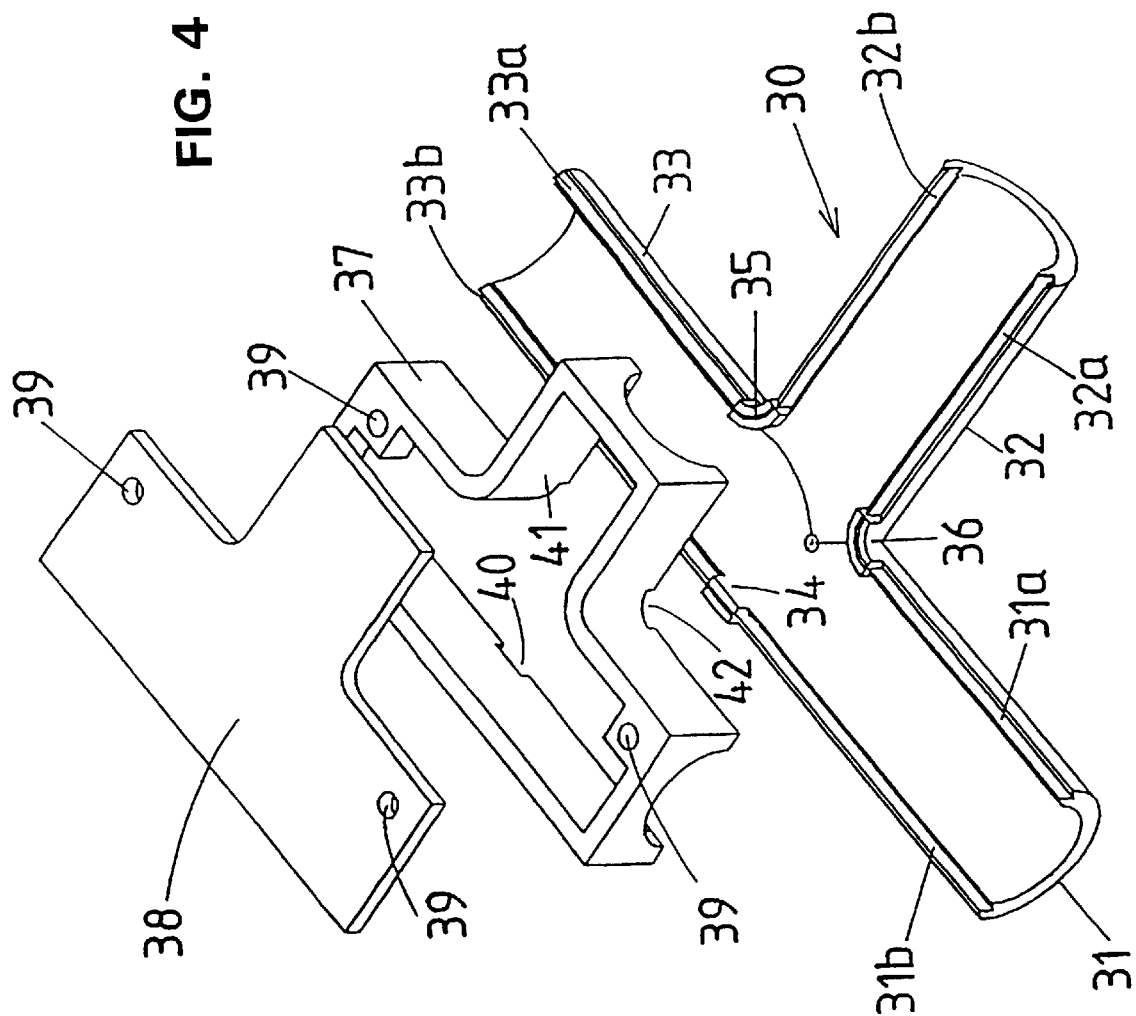
FIG. 4 shows a tee fitting according to a further aspect of the invention.

FIG. 4 shows an alternative embodiment of a conduit fitting according to the invention.

While it will be clear with reference to the embodiment illustrated in FIG. 3, tee, cruciform and other branched junctions can be formed with identical half fittings, the embodiment of FIG. 4 illustrates alternative optional features.

In FIG. 4, the half tee fitting 30 comprises three limbs 31, 32 and 33 with respective opposed tongue and groove formations 31a, 31b, 32a, 32b and 33a, 33b respectively. Raised abutments 34, 35 and 36 are provided at the junctions between limbs 31, 32 and 33, the purpose of which abutments will be described later.

Instead of mating tee piece 30 with an identical tee piece (without abutments 34, 35, 36 which is within the purview of this invention) in this embodiment an inspection or access hatch fitting 37 is provided. The hatch fitting 37 includes a removable access cover 38 securable by screws or the like to hatch fitting via aligned apertures 39. Hatch fitting also include aligned recesses 40, 41, 42 to receivably locate raised abutment 34, 35, 36 respectively.

In a conduit installation where the various conduit elements are unglued and thus disengagable, the abutments 34, 35, 36 discourage the tendency of tradespersons to insert a pointed object into the junction region of the conduit to separate the elements as it is likely that fragile or easily damaged cable junctions will be located in this area.

Figure 5:
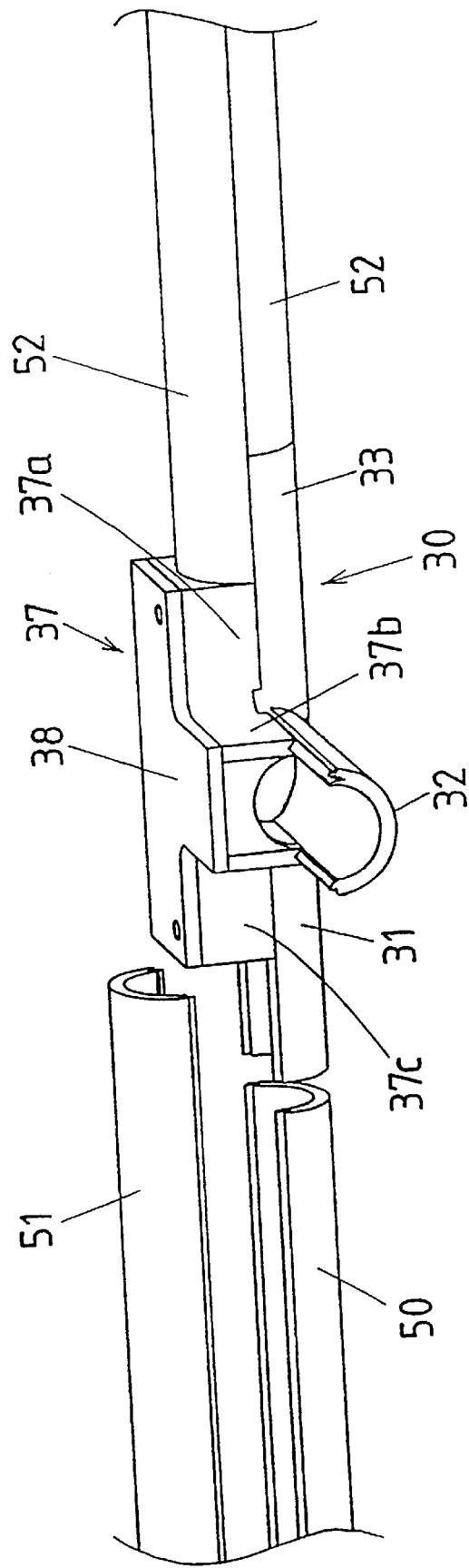
FIG. 5 shows portion of a modular conduit system according to the invention.

FIG 5 illustrates portion of a modular conduit installation according to the invention.

In FIG. 5 the installation comprises an assembled tee junction as illustrated in FIG. 4 with elongate conduit halves 50, 51 and 52, 53 together to form tubular conduits.

As the outer limbs 37a, 37b and 37c of hatch element 37 are shorter than the respective mating limbs 33, 32, 31 respectively of tee element 30, the exposed tongue and groove portions of limbs 31, 32, 33 are available for interengagement with the outer conduit halves 51, 52 to form an integrated conduit system.

As shown in FIG. 5, the tee fitting (or other branched junction according to the invention) may be fitted as part of an initial installation or readily retrofitted to a continuous hollow conduit section.

It will be readily apparent to a person skilled in the art that many modifications and variations may be made to the various aspects of the invention without departing from the spirit and scope thereof.

For example, while the system described, for the purposes of simplicity has been described with reference to an electrical conduit, system, the system, with glued joints is equally applicable to a fluid conduit.

Moreover, while the above described system is advantageous in that there are no stepped interval surfaces in the region of conduit joints or branches which could affect fluid flow or cable threading, the system or parts thereof may be adapted for retro-fitting or repairs to existing conduits by employing internal radii corresponding to external dimensions of existing conduits and conduit fittings.

What is claimed is:

1. A modular conduit system comprising:
   frictionally engageable longitudinally divided elements engageable to form a hollow conduit having a smooth bare of substantially circular cross section, said elements having one or more interengageable complementary tongue and groove formations along opposed free edges thereof, said tongue formation and said groove formation each having at least one radial curvature with the same radial origin located on a central axis of said bore when opposing elements are interengaged, said opposing elements being engageable or disengageable against radially directed resilient restoring forces applied between said opposing elements.

2. A modular conduit system as claimed in claim 1 wherein said tongue formation of one element has a tapered leading edge receivable in a groove formation of an adjacent interengaged element, said groove formation having a floor with a complementary taper.

3. A modular conduit system as claimed in claim 2 wherein a portion of an outer wall of each said element forming an outer side wall of a respective groove formation has a tapered leading edge adapted to engage beneath a complementary tapered recess adjacent a tongue formation of an adjacent interengaged element.

4. A modular conduit system as claimed in claim 3 wherein a portion of an inner wall of each said element forming an inner side wall of a respective groove formation has a shouldered abutment adapted to engage in a complementary shouldered recess adjacent a tongue formation of an adjacent interengageable member.

5. A modular conduit system as claimed in claim 1 wherein longitudinally divided elements comprising the modular conduit system may be selected from elongate parallel sided conduit elements, and conduit fitting elements selected from parallel sided coupling elements, angular bend elements, tee-junction elements, cruciform junction elements and the like.

6. A modular conduit system as claimed in claim 5 wherein each element is configured such that a conduit or conduit coupling may be assembled by respective interengagement of identical conduit elements or conduit fitting elements.

7. A modular conduit system as claimed in claim 6 wherein elements of the modular conduit system include hollow inspection port elements having a removable cover plate, said inspection port elements having tongue and groove formation adapted for interengagement with respective groove and tongue formation on said conduit elements or said conduit fitting elements, respective limbs of said inspection port elements being shorter than the corresponding conduit element or said conduit fitting elements to permit overlapping engagement by a conduit element of an exposed portion of said conduit elements or said conduit fitting elements.

8. A modular conduit system as claimed in claim 5 wherein the conduit fitting elements include raised abutments on the free edges thereof at the junction between adjacent limbs, said raised abutments being engageable in corresponding recesses in the free edges of corresponding inspection portion elements.

9. A modular conduit system as claimed claim 5 wherein the elongate conduit elements and/or the conduit fitting elements may be proportioned to correspond with conventional conduit diameters or they may be formed with an internal diameter to correspond with the external diameter of a conventional elongate one piece conduits and/or conduit fittings such that they may be engaged over an existing portion of conduit system for repair purposes or to introduce branched junctions.

10. A modular conduit system as claimed claim 5 wherein the elongate conduit elements and conduit fitting elements may be interengaged by frictional engagement and retained against disengagement by resistance to radial deformation forces whereby elements of the conduit system may be disengaged selectively.

11. A modular conduit system as claimed in claim 5 wherein the elongate conduit elements and/or conduit fitting elements are permanently interengaged by employment of a suitable adhesive compound in the region of the tongue and groove joints.

12. A method of installation of a modular conduit system according to claim 5 wherein longitudinally divided conduit and conduit fitting elements are engaged to form a substantially continuous channel-like pathway, electrical wiring or the like is progressively introduced into the recess of the channel-like pathway and the conduit system is progressively closed by interengagement of conduit elements with the channel-like pathway already formed to form a closed tubular conduit system.

13. A method of forming a branched junction in a conduit system according to claims 12 wherein selected outermost elements of the modular conduit system are disengaged from inner elements, portion of the exposed channel-like pathway are removed and replaced with a first longitudinally divided branched conduit element, second interengaging branched conduit element is attached to the first element to form an enclosed branched junction and suitably shortened elongate conduit elements are re-engaged with the existing channel-like pathway to form a closed tubular branched pathway.

* * * * *